Nov. 13, 1928.

G. B. CROUSE ET AL 1,691,909

VOLTAGE REGULATOR

Filed Sept. 8, 1926  4 Sheets-Sheet 1

Inventors:
George B. Crouse,
Jacob L. Jatlow,
By Byrnes Townsend Brickenstein,
Attorneys.

Nov. 13, 1928.
G. B. CROUSE ET AL
1,691,909
VOLTAGE REGULATOR
Filed Sept. 8, 1926     4 Sheets-Sheet 2
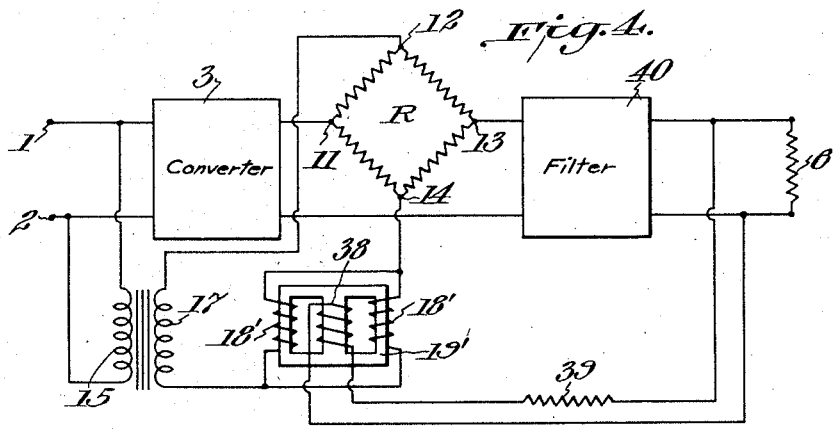
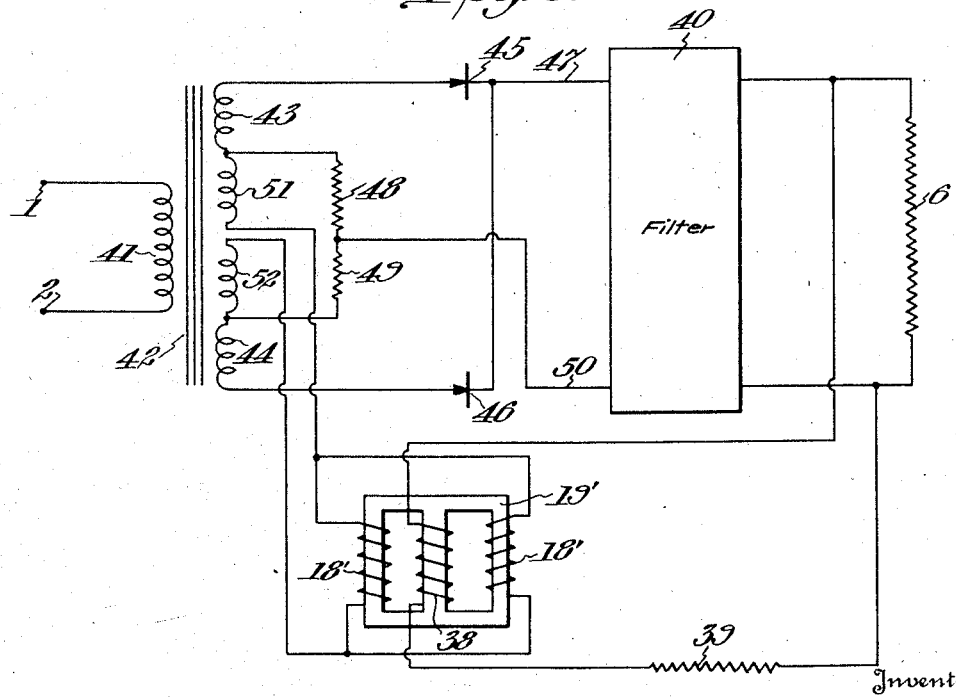
Inventors:
George B. Crouse,
Jacob L. Jatlow,
By Byrnes Townsend & Brickenstein
Attorneys.

Nov. 13, 1928.

G. B. CROUSE ET AL 1,691,909

VOLTAGE REGULATOR

Filed Sept. 8, 1926    4 Sheets-Sheet 3

Inventors:
George B. Crouse,
Jacob L. Jatlow,
By Byron Townsend Brickenstein
Attorneys.

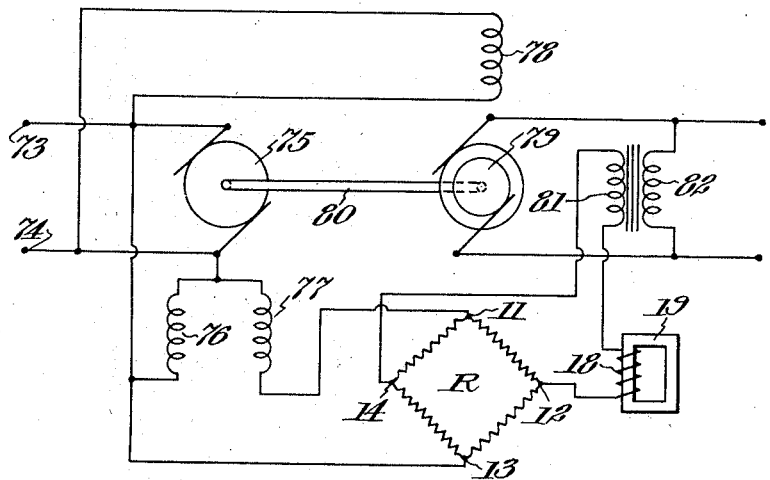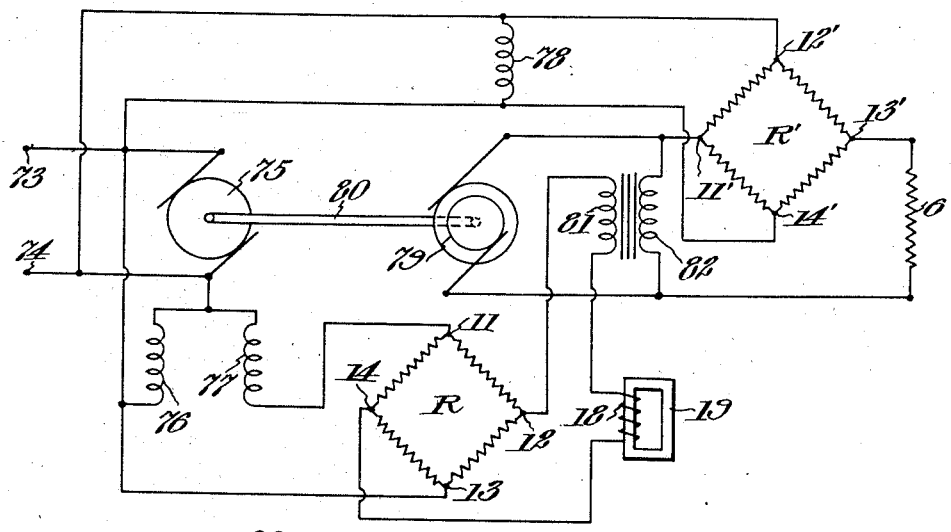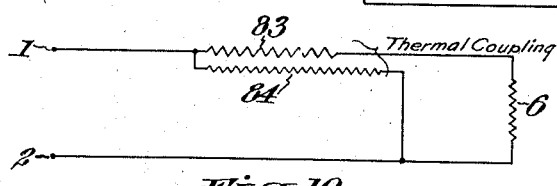

Patented Nov. 13, 1928.

1,691,909

UNITED STATES PATENT OFFICE.

GEORGE B. CROUSE, OF WOODCLIFF, AND JACOB L. JATLOW, OF ELIZABETH, NEW JERSEY, ASSIGNORS TO CONNER CROUSE CORPORATION, OF NEW YORK, N. Y., A CORPORATION OF NEW YORK.

VOLTAGE REGULATOR.

Application filed September 8, 1926. Serial No. 134,249.

This invention relates to voltage regulators and more particularly to automatic regulators for controlling the voltage impressed upon a load line under variations in an electrical condition which tends to alter the voltage across the load.

The invention is particularly useful in effecting a control of the output voltage of an electrical converter. The control is usually designed to maintain the output voltage constant, but this is not essential as the design may be such that the voltage across the load varies in the same sense or in a sense opposite to that which would normally accompany a change in the critical electrical condition upon which the regulation is based. In supplying current to a load from a source of energy and through an electrical converter, the particular electrical condition which determines the regulation may be the input voltage, the voltage across the load itself, or the value of the load.

In accordance with this invention, the desired regulation is effected by passing current from the source or from the load line through a regulating resistance, and controlling the effect of the resistance upon that current by simultaneously subjecting the resistance to the influence of an additional current, which additional current may pass through the regulating resistance or through a separate resistance thermally coupled thereto. The regulating resistance may be formed of material having a negligible or a high temperature-resistance coefficient, and in the preferred embodiments of the invention the resistance is free from mechanically movable parts and electric make-and-break contacts. When the resistance is formed of material having a negligible temperature-resistance coefficient, it is of the type commonly designated a "fixed resistance". Since this term would be misleading when applied to a resistance whose value varies with temperature changes, the term "static resistance" is employed in the following specification and claims to designate a resistance which is free from moving parts or make-and-break contacts, but which may or may not be formed of such material that its effective value varies with temperature changes.

Objects of the invention are to provide methods and apparatus for voltage regulation which shall be economical of power, of simple construction and which will require no mechanically moving parts or electrical make-and-break contacts. An object of the invention is to provide a method and apparatus for effecting a desired control of the voltage across a load line under variations in an electrical condition which tends to alter the voltage across the load. Other objects are to provide methods and apparatus for regulating the voltage across a line in which the regulation is effected by passing source or load line current through a static resistance and controlling the effect of the static resistance upon such current by passing an additional current through the static resistance. More specific objects are to provide a method of and apparatus for regulating a voltage across a load line by means of a temperature-variant resistance element whose effective value is controlled by passing a regulating current through the same. Further specific objects are to provide a method of and apparatus for regulating the voltage across a load line by a static resistance through which the line current or a portion thereof is passed, the effective voltage drop to which such current is subjected being varied by impressing across the resistance an additional voltage which varies in accordance with variations of the input voltage.

These and other objects of the invention will be apparent from the following specification when taken with the accompanying drawings, in which:

Fig. 4 is a diagram of a general form of apparatus for effecting regulation from the output side of a converter;

Figs. 5, 6 and 7 are diagrams of specific forms as applied to converters of the double-wave rectifier type;

Figs. 8 and 9 are diagrams showing the invention as applied to motor generators of the direct current-alternating current type; and Fig. 10 is a circuit diagram of a regulator in which the regulating current is passed through a resistance thermally coupled to the static resistance.

Figure 1:
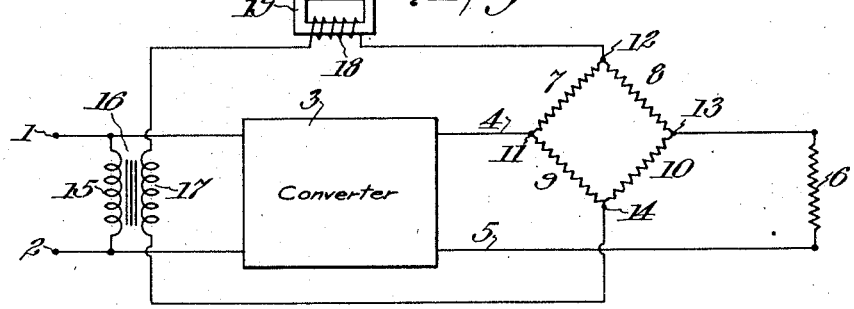
Fig. 1 is a diagram illustrating a general form of the invention for effecting regulation from the source voltage.

Referring to Fig. 1, the reference numerals 1 and 2 denote the terminals of an alternating current supply line, delivering energy to the converter 3 which may be of any type. The direct current output of the converter is led by means of the leads 4 and 5 to the load 6. In the specification and claims the term "converter" is used in the broadest sense as defining a means or combination of means for effecting a change of alternating current to uni-directional current or vice versa or a change of voltage between two direct current circuits or a change of voltage and/or frequency between two alternating current circuits. Inserted in one of the leads, say the wire 4, is a resistance bridge comprising the four arms 7, 8, 9 and 10, which are serially connected in a closed circuit at the junction points 11, 12, 13 and 14. Across the alternating current supply is connected the primary 15 of a transformer which has a core 16 and a secondary 17. One terminal of the secondary winding is directly connected to the junction point 14 of the resistance bridge, the other terminal of winding 17 being connected to the junction point 12 through the coil 18 wound on the closed iron core 19.

The four arms of the resistance bridge are constructed of a material, such as iron, having a high temperature-resistance coefficient. The arms 7, 8, 9 and 10 are so proportioned that there will be no alternating current difference of potential between the junction points 11 and 13, and therefore no alternating current will be introduced from the secondary 17 into the circuit which includes the load 6. Under these circumstances the bridge will also be balanced so that no direct current potential exists between the junction points 12 and 14 and therefore no direct current will be wasted through the circuit including the secondary 17.

The coil 18 with its iron core 19 is preferably so proportioned that at the lowest operating potential between the terminals 1 and 2 the iron will be just at the point of saturation. Under these conditions the resistance interposed in the load circuit by the bridge will be such as to give the correct operating voltage across the load 6. The characteristics of the bridge in relation to the coil 18 and the potential of the secondary 17 may be so proportioned that as the potential of the alternating current input rises, the additional alternating current passed through the bridge will raise the resistance in such proportion that the increase of direct current potential between the wires 4 and 5 due to an increase in alternating current potential will be absorbed by the bridge. Therefore, the potential across the load 6 will remain constant, irrespective of variations within limits of the input alternating current voltage.

The proper proportioning of the various parts for a given load and range of input alternating current potential is a matter of engineering computation which will be well understood by those skilled in the art. Although a constant potential across the load is usually desirable, certain circuit conditions may call for a change in the load line voltage with variations in the source voltage. This change may be in the same sense as the change in source voltage but at a different rate, or it may be in a sense opposite to that of the change in source voltage. The proper design of the parts will enable regulation of these types to be effective in much the same manner as that employed in "under-compounding" or "over-compounding" in motors and generators.

While the use of the coil 18 results in an economy of power and permits greater flexibility in design, it is not essential to the operation of the system. By increasing the proportion of alternating current flowing through the bridge to that of the direct current, regulation may be secured in the same manner as above.

It will be noted that the voltage regulation is effected by passing the load current through a series resistance whose effective value is not determined by a mechanical variation of the amount of a physical resistance which is included in the circuit, but by a variation in the amount of a regulating current which is passed through the resistance simultaneously with the passage of the current flowing in the circuit in which the voltage regulation is desired. As described above, this static resistance may be formed of material having a high temperature-resistance coefficient, but as will appear hereinafter a resistance having a low or negligible temperature variation may be employed for effecting voltage regulation in accordance with this invention.

Figure 2:
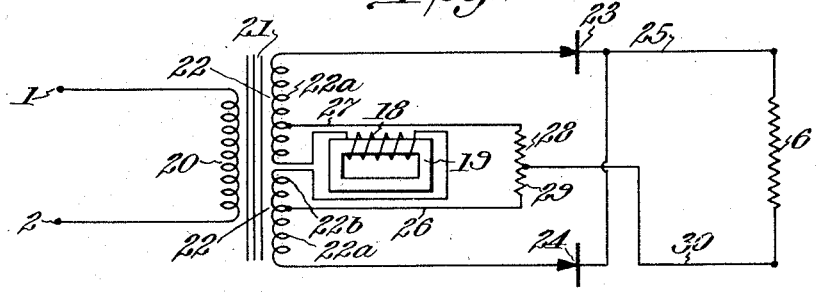
Fig. 2 is a diagram of the invention embodied in a double-wave rectifier type of converter.

In Fig. 2, the same method is shown applied by different means to a converter of a double wave rectifier type. In this diagram the numerals 1 and 2 again represent the terminals of an alternating current supply system connected to the primary 20 of a transformer which has a core 21 and two secondary windings 22. The outer terminals of the secondary windings 22 are each connected to rectifiers 23 and 24, the free terminals of the rectifiers being joined together to form, say, the positive wire 25. Connected to intermediate terminals of the secondary 22 are the wires 26 and 27 which divide the respective secondary windings 22 into outer sections 22$^a$ and intermediate sections 22$^b$, the sections 22$^b$ being connected through the coil 18 which is wound on a core 19. The leads 26 and 27 extend to opposite sides of a resistance 28, 29 and the center point of the resistance is connected to the wire 30 which forms the negative output lead of the system. The load 6 is then connected between the wires 25 and 30. The resistances 28 and 29 may be formed of a material having a high resistance-temperature coefficient, or of such material that the resistance is of substantially constant value.

When the resistances 28 and 29 are of such material that they have a high temperature-resistance coefficient, the operation is similar in a general way to that of the circuit of Fig. 1. An increase of input alternating current potential causes a large increase in alternating current circulating in the circuit including the resistances 28 and 29. This causes an increase in temperature and therefore an increase in resistance of these units. As the static resistance is a series element of the direct current load circuit, an increase in its value causes a lesser portion of the increased direct current voltage to be passed to the load 6. The regulating effect is not due solely, however, to the change in resistance of the members 28, 29, but is modified by the fact that the voltage impressed upon the rectifiers is supplied in part by the intermediate winding $22^b$. The effective voltage as well as the current supplied by the regulating winding therefore affects the voltage across the load. The modifying action of the voltage drop may best be understood by first analyzing the operation of the circuit as constructed with resistance elements 28, 29, which are of substantially constant value.

The effective alternating current voltage applied to a given rectifier, for instance, the rectifier 23, consists of two parts, one applied from the upper winding $22^a$ and the other arising from the voltage drop across the resistance 28 due to the intermediate winding $22^b$. The voltages set up across the terminals of the windings $22^a$, $22^b$, are dependent upon the source voltage and will both vary in the same sense and at the same rate with changes in the source voltage. By a proper design of the elements the effect of a change in the voltage across the windings $22^a$ may be compensated, in whole or in part, by the change in the voltage drop across the resistance 28 which results from the simultaneous change in voltage induced in the windings $22^b$, as modified by the coil 18. When it is desired to make use of the action just described, the use of the inductance 18 is essential, as otherwise the drop across the resistance would be a constant proportion of the source voltage. In the foregoing explanation the difference in phase between the voltage of the winding $22^a$ and that impressed across the resistance 28 by the winding $22^b$ is not taken into account. This phase difference must be considered in the structural design of a system, but does not affect the validity of the above explanation of operation.

Returning to a consideration of the operation of the system when the elements 28 and 29 are formed of material having a high temperature-resistance coefficient, it will be apparent that the effective voltage drop to which current from the winding $22^a$ is subjected on passage through the resistance 28 is dependent both upon the magnitude of the regulating current originating in the winding $22^b$ and upon the voltage drop to which that current is subjected on passing through the resistance. Both of these factors must be considered in the structural design and their separate effects may be either aiding or opposing with respect to each other.

Figure 3:
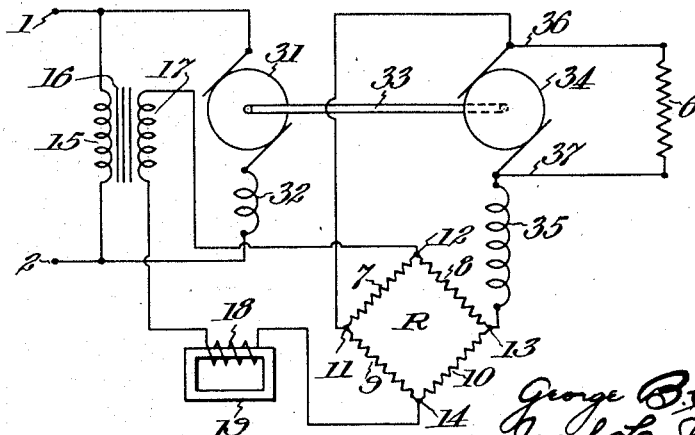
Fig. 3 is a diagram of the invention as embodied in a motor generator.

In Fig. 3 is shown a modification of the method applicable to the control of the output potential of an alternating current-direct current motor generator. In this diagram, as before, the alternating current input terminals 1 and 2 are shown as feeding power to a series type motor having a commutator 31 and a series field 32. This motor is joined by the shaft 33 to a direct current generator having a commutator 34 and a self-excited shunt field 35. The load 6 is joined to the output of the motor by means of the wires 36 and 37. Inserted in the shunt field 35 is the resistance bridge comprising the four arms 7, 8, 9 and 10, having junction points 12, 13, 14 and 11. As before, the primary 15 of a transformer is connected across the alternating current input leads. One terminal of the secondary 17 is joined to the junction point 12 of the bridge, the other terminal being connected to the junction point 14 through the coil 18 on its iron core 19.

The elements of the system should be so proportioned that when the alternating current potential between the input terminals 1 and 2 is at its lowest operating value, the potential delivered by the direct current generator to the load 6 will be at its selected value.

As described in connection with Fig. 1, an increase of input potential between the terminals 1 and 2 will cause an increase of alternating current to flow through the circuit including the bridge. This increase in current will cause an increase of the resistance interposed in the exciting field 35 and therefore a reduction of voltage across the terminals 36 and 37 from this cause. At the same time the increase of input potential has caused an increase of speed of the alternating current motor. By properly proportioning the various elements of the circuit, and more particularly the coil 18 and its core 19 and the characteristics of the bridge, the two effects may be made to substantially cancel each other so that a uniform direct current potential is maintained across the load 6 under conditions of varying input potential.

While in Figs. 1 and 3 the invention has been described as controlling the direct current output of the converter under varying alternating current input, it will be readily appreciated that suitable modification will enable one to control the alternating current output of a converter under conditions of varying direct current input.

In the circuits, as above described, the regulation of the load line voltage is effected in accordance with changes of the input or source voltage. The regulation may, however, be effected in accordance with variation in voltage across the load circuit or variations in the magnitude of the load. To secure a control of this type small variations in the voltage across the load are caused to effect relatively large variations of current in a regulating circuit which is connected across a static resistance in the load circuit.

In the circuit diagram of Fig. 4 the elements of the source, converter and load line circuit which are identical with the corresponding elements of Fig. 1, are identified by corresponding reference characters and a detailed description of the elements is believed to be unnecessary. To control the magnitude of the regulating current impressed across the resistance bridge by the transformer 15, 17, from the voltage across the load line, an inductance 18', having a core 19', is provided between one terminal of the winding 17 and the junction point 14 of the bridge. The inductance 18' consists of two coils which are connected in parallel and wound, in opposite directions, upon the outer legs of a three-legged iron core. To control the reactance of the inductance 18', the magnetic saturation of the iron core 19' is controlled by means of a coil 38 which is wound on the inner leg of the core and is connected in parallel with the load 6 through a series resistance 39. By properly proportioning the various elements of the regulating circuit a very small increase of voltage across the load 6 will be sufficient to effect a large increase of current flowing through the bridge from the circuit 17. The change in magnitude of the regulating current produces a change of resistance between the points 11 and 13 of the bridge. The control is dependent upon a change in the voltage across the load and therefore only approximately constant voltage across the load can be secured, but the relative amount of the variation may be reduced to any desired degree by a suitable design of the parts.

Although not limited in its application to a supply system for delivering a substantially ripple-free current from an alternating current source the invention is particularly adapted for such use. A filter 40 of any desired type may be included in the load line between the converter 3 and the load 6. When the bridge is balanced for the alternating current potential at the junction points 11 and 13, the passage of the regulating current through the resistance bridge will not introduce an alternating current component into the output of the converter. The balance of the bridge is also effective to prevent a waste of direct current through the circuit of the secondary winding 17. The resistance 39 must permit the passage of sufficient current to effect the desired regulation, but is preferably of such relatively high value that the amount of direct current required by the voltage regulator will be small as compared to the current passed over the load. The two sections of the inductance 18' are so proportioned that no alternating current potential will be introduced to the load circuit through the coil 38.

The circuit of Fig. 5 illustrates an embodiment of the invention which is similar to that shown in Fig. 2, but differs from that embodiment by including elements for effecting a regulation from the output side of the converter. In this circuit the numerals 1 and 2 indicate the terminals of an alternating current supply line across which the transformer primary 41 is connected. The transformer has a core 42 and a pair of secondary windings 43, 44, for supplying current to the rectifiers 45, 46, respectively. Like terminals of the rectifiers 45, 46 are connected to each other and to one side 47 of the direct current load line, the other rectifier terminals being connected to a terminal of the respective secondary windings 43 and 44. The other terminals of secondaries 43, 44 are connected to each other through a series resistance comprising sections 48, 49 whose junction point serves as the terminal for the other side 50 of the load line. The static resistance 48, 49 may be of substantially constant value or its value may vary with its temperature. The winding for impressing a regulating voltage across the static resistance is preferably formed in two sections 51, 52, whose outer ends are joined to those terminals of the windings 43, 44 which are connected to the static resistance. The inner ends of the sections 51, 52 of the regulating secondary are connected through a series inductance comprising the two oppositely wound coils 18' on the outer legs of the three-legged core 19'. The winding 38 for determining the magnetic saturation of the core is preferably connected to the load line through a series resistance 39. A filter 40 may be used between the converter and the load 6 to remove alternating current components from the current supply.

The operation of the circuit is similar to that of the circuit of Fig. 2. The magnitude of the regulating current supplied by the winding 51, 52 is determined by the reactance of the inductance 18' which is varied in the manner stated with reference to the circuit of Fig. 4.

The embodiments illustrated in Figs. 4 and 5 effect a regulation under varying conditions of load resistance and input voltage, which regulation does not, however, maintain a constant voltage across the load since it is this voltage which is the critical electrical condition upon which the control is based. The regulation of the line voltage may be made dependent upon the value of the load resistance by including the load as one arm of a bridge circuit.

Many of the elements of a circuit for effecting regulation by fluctuations in the magnitude of the load may be practically identical with the corresponding elements of a circuit in which the regulation is based on variations of the voltage across the load. The circuit of Fig. 6 differs from that of Fig. 5 as to the connections between the control winding 38 and the load line. The load line and the control winding 38 are arranged as the cross-arms of a bridge which is formed by the load 6 and the impedances 53, 54 and 55. The resistance 55 should be of comparatively low value and of the same current carrying capacity as the load 6. The resistances 53 and 54 should preferably be of high resistance in comparison with the load 6 and resistance 55, and may be of smaller current carrying capacity.

Figure 6:
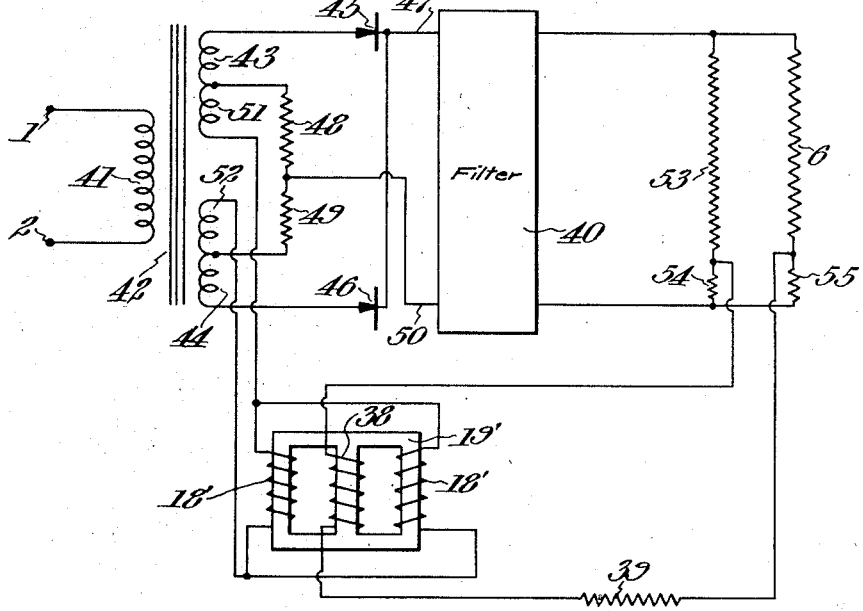

It will be noted that the circuits of Figs. 5 and 6 differ as to the relative sense of the windings 43, 44 and the windings 51, 52 of the regulating circuit. As shown in Fig. 5, the sets of secondary windings are opposed, and in Fig. 6 the secondaries are all wound in the same sense. The relative sense of the windings must be considered in the design of the circuit elements, but either the opposed or aiding windings may be used in a particular circuit.

When the load line secondary 43 and the regulating secondary 51 are wound in the same sense, the bridge in which the load 6 is included should be so arranged that a decrease in the load resistance will cause an increase of direct current to flow in the control winding 38. This increase of current will change the magnetic saturation of the core 19', a greater alternating current will therefore be allowed to pass from winding 51 to the resistance 48, a larger regulating potential drop across this element will be applied to aid the voltage of the secondary 43 and thus an increase in voltage across the load line 47, 50 will result. By a proper design of the various elements the voltage across the load may be kept constant as the line voltage changes in accordance with fluctuations in the load resistance. This system of regulation does not correct for variations in the source voltage. If the voltage of the source is subject to objectionable large variations, an additional control of the types shown in Figs. 1 and 2 may be combined with the control circuit of Fig. 6.

While the above explanation has been directed to only one-half of the rectifier system, it will be apparent that the same effect takes place across the other half. As previously stated the voltages of the coils 43, 44 will not be in phase with the voltages established in the resistance 48, 49 by the regulating windings and this difference in phase should be taken into account in the design of a particular regulating system. The design of the parts will also be dependent upon the temperature-resistance characteristics of the static resistance elements.

Figure 7:
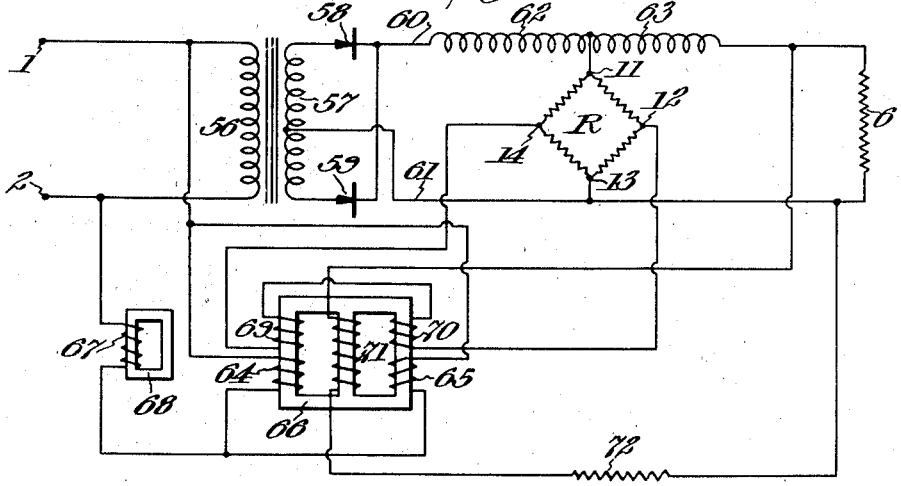

As shown in Fig. 7, one element of a filter in the direct current line may serve as the static resistance. The terminals 1, 2 of an alternating current source energize the primary winding 56 of a transformer having a double secondary winding 57 for passing both halves of the current wave to the rectifiers 58, 59. The direct current load line 60, 61 is connected to the junction of the rectifiers and to the central tap of the secondary 57 in the usual manner. The filter for eliminating alternating current components from the current passed to the load 6 takes the form of a well known type having series inductances 62, 63 and a resistance connected across the line between their junction point and the return wire 61. This cross resistance is given the form of the resistance bridge R, such as described above. The four elements are formed of material having a high temperature-resistance characteristic and are serially connected in a closed circuit at the junction points 11, 12, 13 and 14. The junction points 11 and 13 are connected to opposite sides of the direct current line and the regulating current is introduced through the other pair 12, 14 of conjugate junction points.

Across the alternating current supply line are connected the parallel primary windings 64 and 65 wound on the outside legs of a three-legged iron core 66. These windings are so connected that the flux generated by the current flowing into them traverses only the outside legs and does not flow through the center leg. In series with the primaries 64 and 65 is connected the coil 67 on its iron core 68. This coil and core is so designed that the iron will not be saturated in the normal working range of the system. The secondaries are shown as connected in series and their output is joined to the junction points 12 and 14 of the resistance bridge. The bridge is so designed that it will be balanced for alternating currents at the points 11 and 13 and therefore no alternating current will be applied to the filter system by the secondaries 69 and 70. Similarly, the bridge is balanced for direct current between the points 12 and 14 and therefore no direct current will escape from the filter system and be wasted in the secondaries.

On the center leg of the core 66 is placed a winding 71 connected across the direct current load 6 and having in series with it a limiting resistance 72.

It will be apparent that if the resistance between the points 11 and 13 can be automatically increased as the voltage across the load 6 tends to fall, that by proper proportion of the resistance between these points in relation to the resistance of the inductances 62 and 63, approximate compensation of the load voltage may be secured under conditions of varying load resistance or line voltage. The resistance between the junction points 11 and 13 is principally determined by the alternating current voltage applied between the points 12 and 14. This voltage is determined by the line voltage and by the relative distribution of this voltage between the coil 67 and the parallel primaries 64 and 65. Since the core 68 is never saturated, the reactance of the coil 67 will remain substantially constant, whereas the reactance of the primaries 64 and 65 will vary with the amount of direct current flowing in the coil 71.

As the voltage across the load 6 increases more current flows in the coil 71, causing the reactance of the primaries 64 and 65 to be reduced, thus causing a reduction of alternating current voltage applied between the points 12 and 14 by the secondaries 69 and 70, thus causing a decrease in the resistance of the bridge and therefore a decrease of resistance between 11 and 13, thereby causing an increase of potential drop in the resistance of the coil 62 and thus preventing further increase of voltage across the load 6. Regulation is approximate as the critical electrical condition upon which it is based is the voltage across the load, but any desired degree of approximation may be secured.

In each of the above converter circuits, the magnitude of the output voltage has been determined by a regulating current withdrawn from the source or input side of the converter and controlled by fluctuations at the input and/or output side. The invention is also useful in connection with frequency control of motor-generators of the direct current-alternating type.

In the circuit diagram of Fig. 8, the numerals 73, 74 indicate the direct current line or source of energy across which the motor is connected. The motor armature 75 rotates in the field established by the shunt winding 76 and the differential winding 77, which latter winding is supplied from the source through the temperature-variant resistance bridge R. The field 78 of the generator is also supplied from the source 73, 74, and the generator armature 79 is driven from motor armature 76 by a shaft 80 or the like. The regulating circuit for controlling the effective value of the static resistance includes the inductance 18 on a closed iron core 19 and the secondary 81 of an iron core transformer, the primary 82 of the transformer being connected across the alternating current output or load line. The regulating circuit and the differential winding are connected across the conjugate pairs of junction points, 12, 14 and 11, 13 respectively.

A change in the source voltage will cause a change in the current flowing in the generator field 78, which change will be reflected in the voltage of the alternating current output and also in the output of the secondary winding 81 of the regulating transformer. This change in regulating current will result in a large change in the resistance between points 11 and 13 of the resistance bridge R, and consequently in the current flowing in the differential field winding 77. As a general rule, the current flowing in the differential winding is controlled in such manner that the total motor field strength so varies, in relation to the voltage applied to the motor armature, that a constant motor speed and consequently a constant output frequency will be maintained. If, for example, the voltage across the source lines 73, 74 rises, the motor would ordinarily increase in speed. The increase in source voltage results in a stronger generator field and consequently an increased alternating current voltage. The increased output voltage operates through the regulating transformer and saturation choke coil 18 to increase the regulating current flowing through the static resistance. The resistance of the bridge R is thus increased and the current flowing in the differential winding 77 is thereby reduced. The motor field strength is therefore increased and consequently the motor speed tends to fall. By an appropriate design of the elements, the increase in motor field strength may be just sufficient to counteract the tendency toward increased speed which resulted from the increase of source voltage.

The motor-generator circuit of Fig. 9 shows this frequency control system combined with an output voltage control. The frequency control elements may be identical with the various elements of Fig. 8 and the same numerals are therefore applied to corresponding elements of these circuits. The control of the alternating current voltage impressed upon the load line is effected by a second temperature-variant resistance bridge R' which is included in the load line of the alternator beyond the transformer primary 82. The load line is connected to the bridge at conjugate junction points 11' and 13', and the regulating current is supplied by connecting the source across the other pair of junction points 12' and 14'. If the source voltage increases, the frequency regulation is effected in the manner described above, and the increased source voltage causes more direct current to pass through bridge R' to thereby increase the resistance offered to the alternating current. By appropriate design, the entire increase in alternating current output voltage may be absorbed in the bridge R'; consequently a substantially constant output voltage will be maintained under conditions of varying supply voltage.

In each of the above embodiments of the invention the regulating current as well as the regulated current passes through the static resistance. When the static resistance has a high temperature-resistance coefficient, the regulating effect may be secured by a thermal coupling between the static resistance and a separate resistance through which the regulating current is passed. A typical circuit of this type is illustrated in Fig. 10. The numerals 1 and 2 indicate the terminals of a suitable source which energizes the load 6 through the series resistance 83. The series resistance has a high temperature-resistance coefficient and is thermally coupled to a shunt resistance 84 which is of the non-temperature variant type. The shunt resistance is connected across the line between the source and the static resistance 83. It will be apparent that variations in source voltage will result in variations in the magnitude of the regulating current passed through the shunt resistance, and therefore in variations in the temperature and effective resistance of the static resistance. The parts will, of course, be designed to secure the desired regulation. If desired, the static resistance and the heating resistance may form elements of separate circuits which are thermally coupled but which have no electrical coupling.

Attention is directed to the fact that an automatic regulation of voltage as to magnitude and/or as to frequency may be obtained without the use of mechanically movable parts or electric make-and-break devices. It will be obvious that while certain elements may be moved for effecting a preliminary or occasional adjustment of a particular system, the actual regulation for variations in a critical electrical condition will take place automatically when the parts are suitably designed to effect that result.

It is to be understood however that while the invention may be embodied in an automatic regulator, manually operated switches or other devices may be used in connection with or as substitutes for the elements which effect the automatic regulation. So far as applicants are aware, it is broadly new to effect voltage regulation by introducing a resistance as an element of the circuit in which regulation is desired and controlling the effect, in that circuit of the resistance, by simultaneously subjecting the resistance to the influence of a regulating current which is varied in accordance with the desired nature of the regulation. The several circuits described herein indicate the manner in which the invention may be practiced, but it is apparent that the invention is not limited to these illustrative circuits.

The methods and apparatus which we have described herein and which do not fall within the scope of certain of the following claims, form the subject matter of divisional applications Ser. Nos. 135,691, 135,692, 135,693 and 135,694, all filed on September 15, 1926. Briefly the first of these applications covers the use of the static resistance in shunt across the load and also as an element of a filter; regulation dependent upon output voltage and the use of a temperature variant resistance. The second application covers the use of a non-temperature-variant resistance and regulation dependent upon input voltage. The third application covers the use of a non-temperature-variant resistance with control dependent upon output voltage or load resistance. The fourth application covers the application of the invention to motor-generator types of converters, frequency regulators and speed control for motors.

We claim:

1. In a voltage regulator for electrical systems comprising a source of energy, a load line, and circuit elements for energizing said load line from said source, the combination of a static resistance included in said circuit elements, and a circuit additional to said circuit elements for delivering a current to said static resistance to directly effect regulation by the potential across said resistance, said additional circuit being so coupled with said circuit elements that the voltage of said additional circuit varies automatically with variations of an electrical condition which tends to alter the voltage across said load line.

2. In an electrical system, the combination with a source of electrical energy, a converter, a load line, and circuit connections for energizing said load line from said source by means of said converter, of a static resistance included in said circuit connections and traversed by currents delivered from said converter, and means for regulating the effective voltage drop to which said converter-delivered current is subjected by passing through said resistance, said means comprising a circuit for passing a regulating current through said resistance, and so coupled to said circuit connections that the magnitude of the regulating current automatically varies in accordance with changes in an electrical condition in said circuit connections which tend to alter the voltage drop across said load line.

3. In an electrical system, a converter adapted to deliver energy from a source to a load line, a static resistance having a high temperature-resistance coefficient and arranged in the circuit of said converter and load line for directly affecting the load voltage, and means for subjecting said resistance to the heating effect of a current withdrawn from said source and electrically isolated from said load line.

4. In an electrical system, the combination with a source of electrical energy, a load line, and circuit connections for energizing said load line from said source, of a resistance included in said circuit connections and having a high temperature-resistance coefficient, and means for heating said resistance by the Joulean effect of a current electrically isolated from the load current delivered by said source the circuit of the regulating current which heats said resistance being so coupled with the said circuit connections that the voltage of said regulating current automatically varies in accordance with variations in the voltage of the source.

5. In a system for supplying a direct current line from an alternating current source, a rectifier adapted to be connected across the alternating current source, a static resistance in the direct current circuit of said rectifier, and a regulating circuit for passing alternating current from said source through said resistance to control the direct current voltage drop across the same, said circuit comprising a transformer having a primary energized by said source, a secondary and an inductance in series with said secondary and said resistance.

6. The invention as set forth in claim 5, wherein the elements of said regulating circuit are so constructed and arranged that the voltage of said regulating circuit is proportional to the voltage of said source.

7. The invention as set forth in claim 5, wherein said static resistance is composed of four sections having high temperature-resistance characteristics and arranged as the four side arms of a Wheatstone bridge, the conjugate pairs of junction points of said sections serving as terminals for the direct current circuit and the alternating current circuit, respectively.

8. In a converter system for energizing a direct current load line, the combination of a converter adapted to be energized by alternating current, four resistances having high temperature-resistance coefficients, said resistances being serially connected at four junction points to form a closed circuit, a connection between one of the said junction points and an output terminal of said converter, and a regulating circuit connected across the two junction points at each side of and next adjacent to said first junction point, said fourth junction point serving as an input terminal for said load line, whereby the regulating and regulated circuits through said resistances may be isolated by balancing the four resistances.

9. The invention as set forth in claim 8 wherein said regulating circuit includes elements for coupling the circuit to the alternating current source to which the converter is connected.

10. A voltage regulator comprising a static resistance adapted to be inserted in the circuit in which the voltage is to be regulated, and a circuit electrically isolated from the regulated circuit for controlling the effective value of said resistance to directly effect regulation by the potential across the resistance.

11. In a voltage regulator, a resistance having a high temperature-resistance coefficient, said resistance adapted to be included in the circuit in which the voltage is to be regulated, and electrical means independent of the circuit in which said resistance is included for controlling the temperature and thereby the effective resistance thereof to directly effect regulation by the potential across the resistance.

12. In a voltage regulator, a Wheatstone bridge composed of resistance elements having a high temperature-resistance coefficient, means connected across two opposite junction points of said bridge for supplying a temperature regulating current thereto, and means for connecting a circuit in which voltage regulation is to be effected across the conjugate pair of juction points, whereby the regulated circuit and the regulating circuit may be electrically isolated by balancing the bridge.

13. In a voltage regulator for electrical systems, comprising a source of current, a load and circuit connections between the source and the load, the combination of a static resistance in the connections and an additional circuit for delivering a regulating current to the resistance to directly effect regulation by the potential across the resistance, said resistance being arranged to prevent passage of the regulating current through the circuit connections to the load.

14. A voltage regulator for an electrical system of the type including a converter connected between a source of alternating current and a load, comprising an element connected in series between the converter and the load and means for varying the voltage drop across the element in accordance with voltage variations of the source, said element also preventing the introduction into the load circuit of alternating components from the source.

15. In a voltage regulator for electrical systems comprising a source of current, a load and circuit connections between the source and the load, the combination of a static resistance in the connections, an additional circuit for delivering a regulating current to the resistance and means in the additional circuit for causing small variations in the voltage to be regulated to cause relatively large variations of regulating current in the resistance.

16. In a voltage regulator for electrical systems comprising a source of current, a load and circuit connections between the source and the load, the combination of a static resistance in the connections, an additional circuit for delivering a regulating current to the resistance and a coil in the additional circuit wound upon an iron core substantially at the point of saturation at the lowest operating voltage of the source.

17. In an electrical system, a source of energy, a load energized from said source through a circuit between them, a static resistance having a high temperature-resistance coefficient and arranged in the circuit to directly affect the load voltage and means for heating said resistance to control the effective voltage drop to which the load current is subjected on passage through said resistance, said means being coupled to said source and arranged to pass through said resistance a heating current which varies in magnitude in accordance with variations in voltage of the source.

18. In an electrical system, the combination with a source of electrical energy, a load line, and circuit connections for energizing said load line from said source, of a resistance included in said circuit connections for directly affecting the load voltage and having a high temperature-resistance coefficient and means for heating said resistance by the Joulean effect of a current electrically isolated from the load current delivered by said source, said resistance comprising four elements arranged as the side arms of a Wheatstone bridge, the circuit connections for the load line and the heating circuit being across the respective conjugate points of the bridge.

19. In a voltage regulator, a load, a source of alternating current for supplying the load, a static resistance between the source and the load and variable in response to variations in the current flowing therethrough and means for controlling the effective regulating value of said resistance including a coil on a closed iron core for permitting current additional to the load current to flow through the resistance.

20. In a voltage regulator, a load, a source of alternating current for supplying the load, a static resistance having a high temperature resistance coefficient between the source and the load and variable in response to variations in the current flowing therethrough and means for controlling the effective regulating value of said resistance including a coil on a closed iron core for permitting current additional to the load current to flow through the resistance.

21. In a converter system for energizing a direct current load line, the combination of a converter adapted to be energized by alternating current, four resistances having high temperature-resistance coefficients, said resistances being serially connected at four junction points to form a closed circuit, a connection between one of the said junction points and an output terminal of said converter, and a regulating circuit connected across the two junction points at each side of and next adjacent to said first junction point, said fourth junction point serving as an input terminal for said load line, whereby the regulating and regulated circuits through said resistances may be isolated by balancing the four resistances, said regulating circuit including elements for coupling the circuit to the alternating current source to which the converter is connected and said elements being so constructed and arranged that the voltage across said regulating circuit varies as the voltage of said source.

In testimony whereof we affix our signatures.

GEORGE B. CROUSE.
JACOB L. JATLOW.

---

CERTIFICATE OF CORRECTION.

Patent No. 1,691,909.   Granted November 13, 1928, to

GEORGE B. CROUSE ET AL.

It is hereby certified that error appears in the printed specification of the above numbered patent requiring correction as follows: Page 8, line 4, claim 4, after the word "connections" insert the words "for directly affecting the load voltage"; and that the said Letters Patent should be read with this correction therein that the same may conform to the record of the case in the Patent Office.

Signed and sealed this 15th day of January, A. D. 1929.

(Seal)

M. J. Moore,
Acting Commissioner of Patents.